United States Patent
Lin

(10) Patent No.: US 9,058,134 B2
(45) Date of Patent: Jun. 16, 2015

(54) SIGNAL SYNCHRONIZING DEVICE

(75) Inventor: Jui-Yuan Lin, Chiayi County (TW)

(73) Assignee: Realtek Semiconductor Corp. (TW)

( * ) Notice: Subject to any disclaimer, the term of this patent is extended or adjusted under 35 U.S.C. 154(b) by 582 days.

(21) Appl. No.: 13/419,711

(22) Filed: Mar. 14, 2012

(65) Prior Publication Data
US 2013/0073890 A1 Mar. 21, 2013

(30) Foreign Application Priority Data

Mar. 18, 2011 (TW) .............................. 100109341 A

(51) Int. Cl.
*G06F 1/12* (2006.01)
(52) U.S. Cl.
CPC ........................ *G06F 1/12* (2013.01)
(58) Field of Classification Search
USPC ........................................................ 713/400
See application file for complete search history.

(56) References Cited

U.S. PATENT DOCUMENTS

| 5,987,081 A * | 11/1999 | Csoppenszky et al. ....... 375/354 |
| 7,134,035 B2 | 11/2006 | Sharma et al. |
| 7,977,976 B1 * | 7/2011 | Tang et al. ..................... 326/94 |

FOREIGN PATENT DOCUMENTS

| CN | 1302132 | 7/2001 |
| CN | 1725639 | 7/2005 |

OTHER PUBLICATIONS

Search Report dated May 22, 2014 in CN Appln. No. 2012100416215 (with English translation).

* cited by examiner

*Primary Examiner* — Kim Huynh
*Assistant Examiner* — Paul J Yen
(74) *Attorney, Agent, or Firm* — Davidson Berquist Jackson & Gowdey LLP

(57) ABSTRACT

A signal synchronizing device includes a trigger module for capturing an input signal according to a first clock signal which corresponds with the input signal so as to generate a trigger signal, a storage unit for forming a first pulse signal by pulling an output thereof to a first logic level according to the trigger signal, and by pulling the output thereof to a second logic level according to a feedback reset signal, and a synchronizing module for performing synchronous transfer according to the first pulse signal so as to output an output signal corresponding with frequency of a second clock signal, and for generating the feedback reset signal according to the output signal.

12 Claims, 6 Drawing Sheets

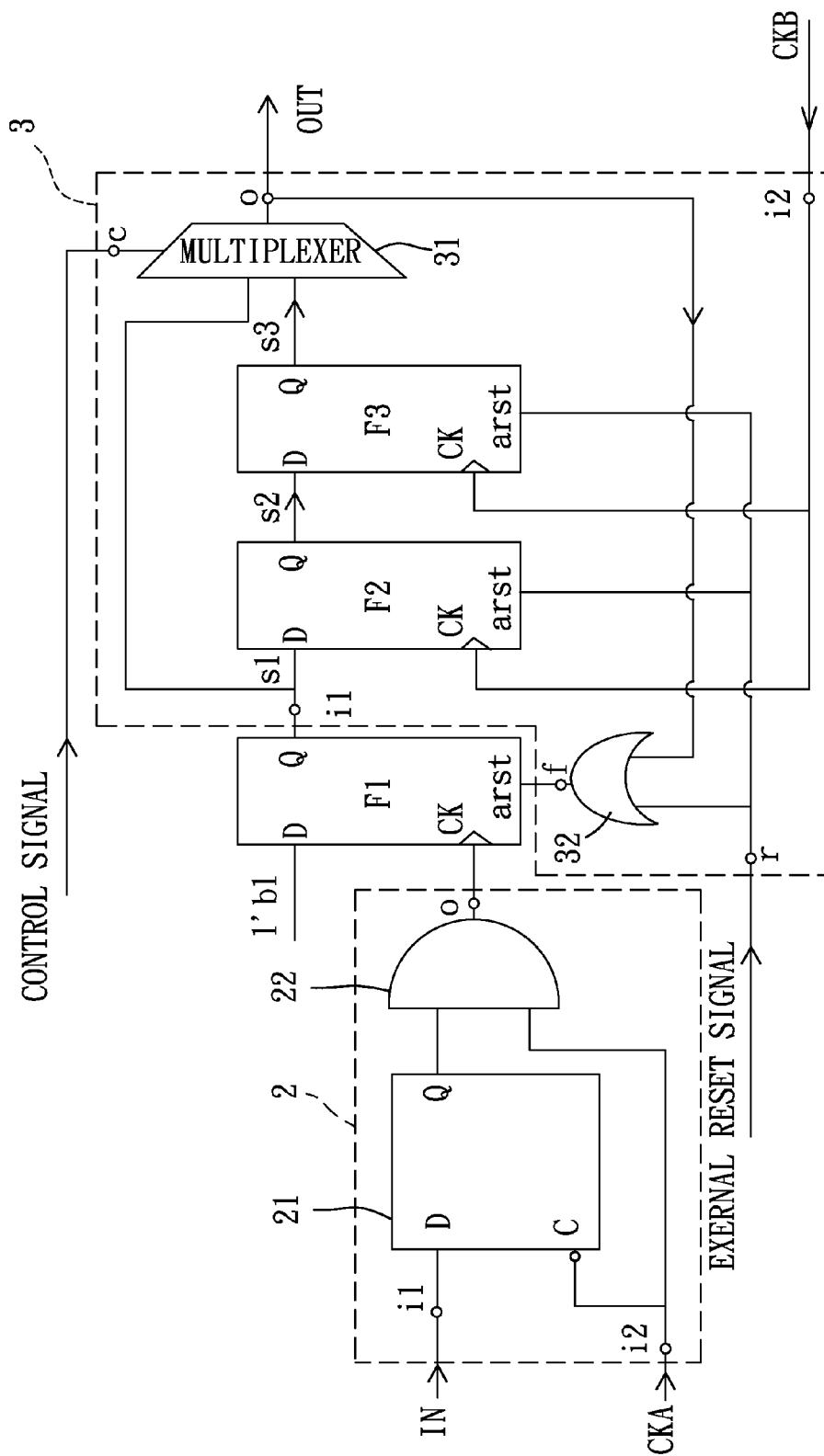
F I G. 3

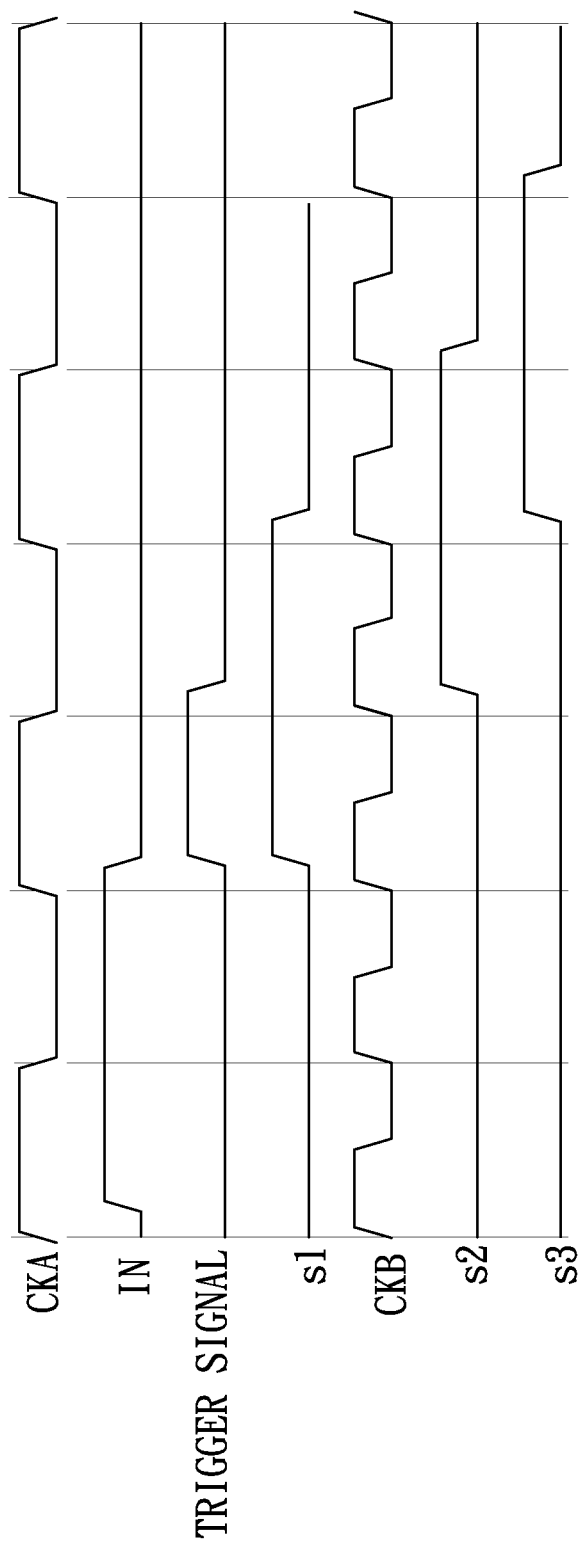
F I G. 6

SIGNAL SYNCHRONIZING DEVICE

CROSS-REFERENCE TO RELATED APPLICATION

This application claims priority of Taiwanese Application No. 100109341, filed on Mar. 18, 2011.

BACKGROUND OF THE INVENTION

1. Field of the Invention

The present invention relates to a signal synchronizing device, more particularly to a signal synchronizing device applicable to a system on a chip (SOC).

2. Description of the Related Art

Since each of multiple logic circuits in a system on a chip is usually required to operate at frequency domains of at least two different clock signals, when signals are transmitted between two logic circuits operating at frequency domains of two different clock signals, the signals must be synchronously processed prior to signal transmission. Otherwise, an issue of meta-stability may occur between the two logic circuits.

Referring to FIG. 1, a conventional signal synchronizing device disclosed in U.S. Pat. No. 7,134,035 B2 is adapted to a system on a chip for transferring an input signal IN which corresponds with frequency domain of a first clock signal CKA into an output signal OUT which is synchronous with respect to frequency domain of a second clock signal CKB. The conventional signal synchronizing device includes a first storage unit F1 and a double synchronizer 1.

The first storage unit F1 receives the first clock signal CKA and the input signal IN, and outputs a first pulse signal which is phase-delayed with respect to the input signal IN by sampling the input signal IN according to the first clock signal CKA.

The double synchronizer 1 is electrically coupled to the first storage unit F1, and includes a second storage unit F2 and a third storage unit F3.

The second storage unit F2 receives the second clock signal CKB and the first pulse signal, and outputs a second pulse signal which is phase-delayed with respect to the input signal IN by sampling the first pulse signal according to the second clock signal CKB.

The third storage unit F3 receives the second clock signal CKB and the second pulse signal, and outputs an output signal OUT which is phase-delayed with respect to the second pulse signal by sampling the second pulse signal according to the second clock signal CKB.

Referring to FIG. 2, a timing diagram of the conventional synchronizing device is illustrated, wherein F10 represents the first pulse signal and F20 represents the second pulse signal.

Since details of the conventional synchronizing device are described in U.S. Pat. No. 7,134,035 B2, they are omitted herein for the sake of brevity.

However, the conventional signal synchronizing device has the following disadvantages:

1. The conventional signal synchronizing device is only applicable to a condition that the frequency of the first clock signal CKA is slower than the frequency of the second clock signal CKB, and thus has a narrower range of applicability. Moreover, since it is required to know in advance which one of the frequencies of the first and second clock signals CKA, CKB in the applied system on a chip is faster, there is inconvenience in use.

2. When the frequency of the first clock signal CKA is faster than that of the second clock signal CKB, and the conventional signal synchronizing device is desired to be adopted, an additional circuit is required for converting the frequency of the first clock signal CKA into another frequency slower than that of the second clock signal CKB. Moreover, another additional circuit (such as a counter) is required to calculate a ratio between frequencies of the first and second clock signals CKA, CKB, so as to know how slow the frequency of the first clock signal CKA is to be converted. Therefore, an increment in hardware costs is incurred.

SUMMARY OF THE INVENTION

Therefore, one of the objects of the present invention is to provide a signal synchronizing device which is convenient to use, which incurs lower hardware costs, and which has a wider range of applicability.

According to the present invention, the signal synchronizing device comprises a trigger module, a first storage unit, and a synchronizing module.

The trigger module is configured for capturing an input signal according to a first clock signal so as to generate a trigger signal in a form of a pulse wave. The first clock signal corresponds with the input signal.

The first storage unit is configured for forming a first pulse signal by pulling an output of the first storage unit to a first logic level according to the trigger signal, and by pulling the output of the first storage unit from the first logic level to a second logic level according to a feedback reset signal.

The synchronizing module is configured for performing synchronous transfer according to the first pulse signal so as to output an output signal corresponding with frequency of a second clock signal, and for generating the feedback reset signal according to the output signal.

BRIEF DESCRIPTION OF THE DRAWINGS

Other features and advantages of the present invention will become apparent in the following detailed description of the preferred embodiment with reference to the accompanying drawings, of which:

FIG. 3 is a circuit diagram illustrating a preferred embodiment of a signal synchronizing device according to the present invention;

FIG. 6 is a timing diagram of a second condition of the preferred embodiment of the present invention.

DETAILED DESCRIPTION OF THE PREFERRED EMBODIMENT

Figure 1:
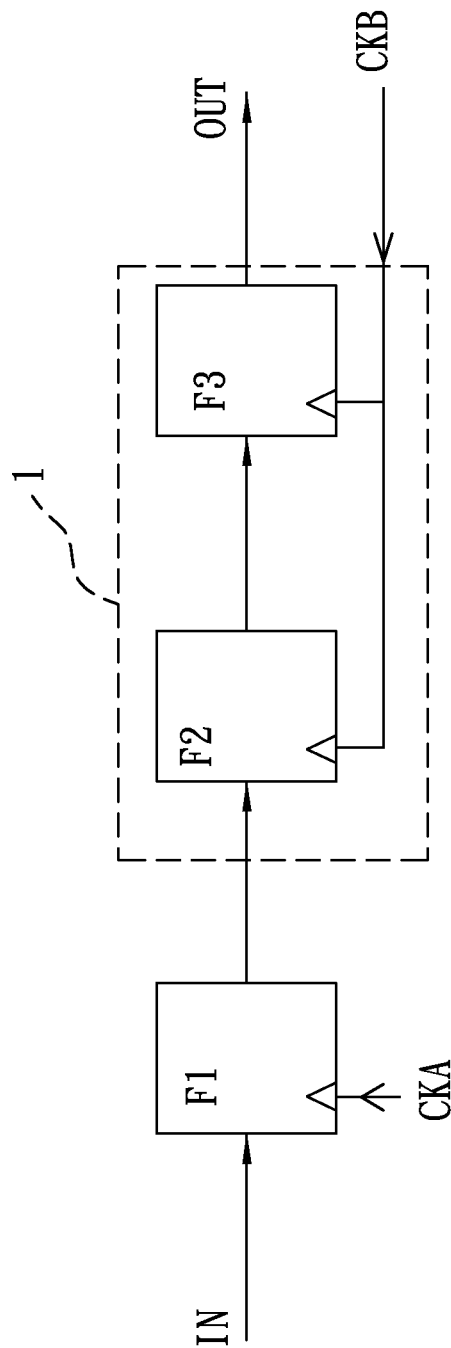
FIG. 1 is a circuit diagram of a conventional signal synchronizing device.
Figure 2:
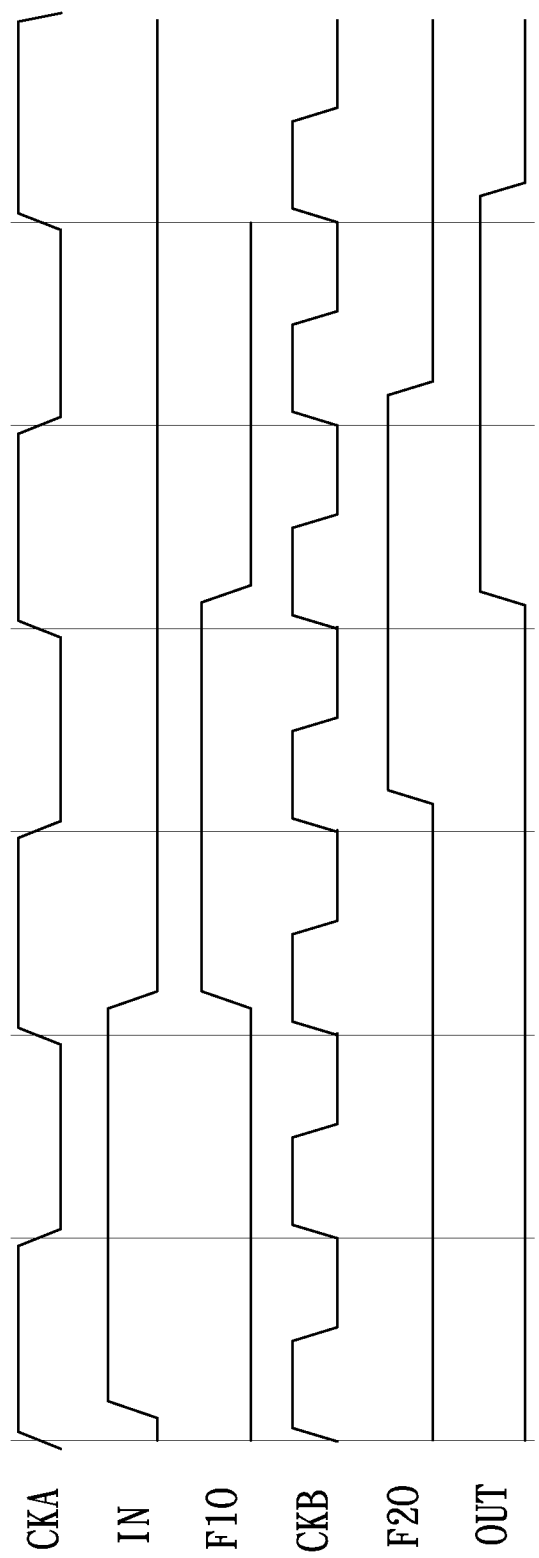
FIG. 2 is a timing diagram of the conventional signal synchronizing device.

Referring to FIG. 3, a preferred embodiment of a signal synchronizing device, according to the present invention, is illustrated. The preferred embodiment is adapted for transferring an input signal IN which corresponds with frequency domain of a first clock signal CKA into an output signal OUT which corresponds with frequency domain of a second clock signal CKB. The preferred embodiment of the signal synchronizing device comprises a trigger module 2, a first storage unit F1, and a synchronizing module 3.

The trigger module 2 includes a first terminal (i1) for receiving the input signal IN, a second terminal i2 for receiving the first clock signal CKA, and an output terminal (o). The trigger module 2 is configured for capturing the input signal IN according to the first clock signal CKA so as to generate a trigger signal in a form of a pulse wave, and for outputting the trigger signal at the output terminal (o). The trigger signal is related to positive half-cycles of the first clock signal CKA.

The first storage unit F1 includes a data terminal D for receiving a first logic level signal (1'b1), a clock terminal CK electrically coupled to the output terminal (o) of the trigger module 2 for receiving the trigger signal, a reset terminal (arst) for receiving a feedback reset signal, and an output terminal Q. The first storage unit F1 is configured for forming a first pulse signal (s1) by sampling the first logic level signal (1'b1) according to the trigger signal so as to pull an output at the output terminal Q of the first storage unit F1 to a first logic level, and by pulling the output at the output terminal Q of the first storage unit F1 from the first logic level to a second logic level which is complementary to the first logic level according to the feedback reset signal. In this embodiment, the first and second logic levels are a high logic level and a low logic level, respectively, but configurations of the first and second logic levels are not limited to the disclosure of the preferred embodiment.

The synchronizing module 3 includes a first terminal (i1) electrically coupled to the output terminal Q of the first storage unit F1 for receiving the first pulse signal (s1), a second terminal (i2) for receiving the second clock signal CKB, a reset terminal (r) for receiving an external reset signal, a control terminal (c) for receiving a control signal, an output terminal (o), and a feedback terminal (f) electrically coupled to the reset terminal (arst) of the first storage unit F1. The synchronizing module 3 is configured for performing synchronous transfer according to the first pulse signal (s1) so as to output the output signal OUT corresponding with the frequency of the second clock signal CKB at the output terminal (o) of the synchronizing module 3. In further detail, the output signal OUT is related to the first pulse signal (s1), and corresponds with the frequency domain of the second clock signal CKB, but the present invention is not limited to the disclosure of this embodiment. Moreover, the control terminal (c) of the synchronizing module 3 receives the control signal such that the synchronizing module 3 is controllable to switch between a first mode and a second mode. The first mode is an asynchronous mode, that is, the frequency of the first clock signal CKA is different from that of the second clock signal CKB. In other words, the first clock signal CKA is asynchronous with respect to the second clock signal CKB. The second mode is a synchronous mode, that is, the frequency of the first clock signal CKA is substantially the same with that of the second clock signal CKB, and the first clock signal CKA is substantially in-phase with respect to the second clock signal CKB.

When the synchronizing module 3 operates in the first mode, the synchronizing module 3 is configured for sampling the first pulse signal (s1) according to the second clock signal CKB so as to generate the output signal OUT which is phase-delayed with respect to the first pulse signal (s1). The synchronizing module 3 is further configured for generating the feedback reset signal which is related to the output signal OUT according to the output signal OUT, and for outputting the feedback reset signal at the feedback terminal (f) of the synchronizing module 3. In this embodiment, when the external reset signal is at the low logic level, the feedback reset signal follows a logic level of the output signal OUT.

When the synchronizing module 3 operates in the second mode, the difference between the first and second modes resides in that the synchronizing module 3 is configured to take the first pulse signal (s1) as the output signal OUT.

Detailed circuits of the trigger module 2 and the synchronizing module 3 are described hereinafter:

The trigger module:

The trigger module 2 includes a latch 21 and an AND gate 22.

The latch 21 includes a data terminal D electrically coupled to the first terminal (i1) of the trigger module 2 for receiving the input signal IN, a control terminal C electrically coupled to the second terminal (i2) of the trigger module 2 for receiving the first clock signal CKA, and an output terminal Q. The latch 21 is configured for providing a latch signal, which follows a logic level of the input signal IN, at the output terminal Q in response to a signal edge of the first clock signal CKA, the signal edge being selected from a rising edge and a falling edge. In this embodiment, the latch 21 is configured for providing the latch signal in response to the falling edge of the first clock signal CKA.

The AND gate 22 has a first terminal electrically coupled to the output terminal Q of the latch 21 for receiving the latch signal, a second terminal for receiving the first clock signal CKA, and an output terminal. The AND gate 22 is configured for performing a logic AND operation between the latch signal and the first clock signal CKA so as to generate the trigger signal at the output terminal of the AND gate 22.

Figure 4:
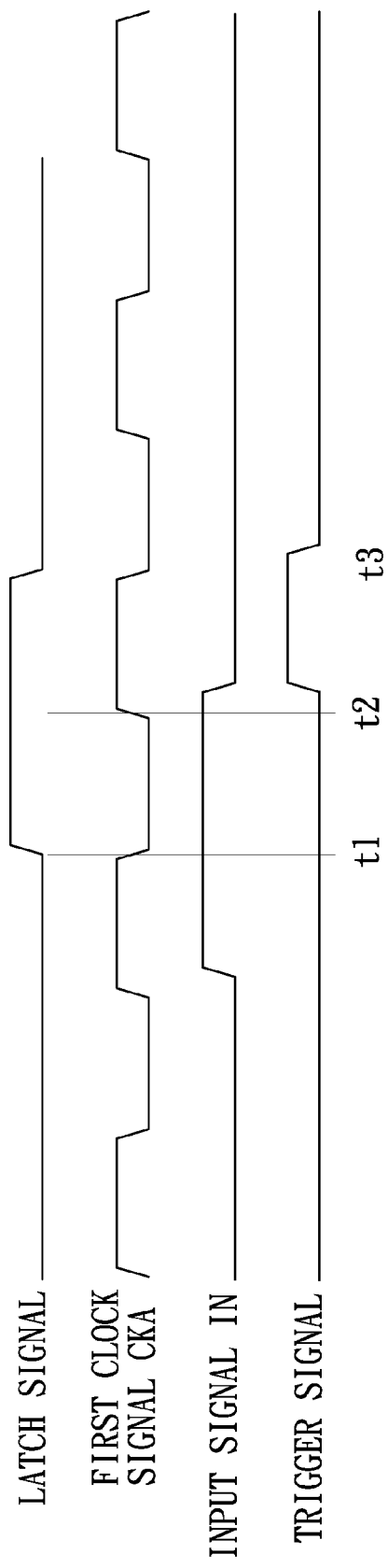
FIG. 4 is a timing diagram of a trigger module of the preferred embodiment.

Referring to FIG. 4, a timing diagram of the trigger module 2 which operates according to the input signal IN and the first clock signal CKA is illustrated. At a time point (t1), the falling edge of the first clock signal CKA actuates the latch 21 to capture the input signal IN at the high logic level so as to generate the latch signal at the high logic level. At a time point (t2), the AND gate 22 generates the trigger signal at the high logic level as a result of the latch signal at the high logic level and the first clock signal CKA at the high logic level. At a time point (t3), since the first clock signal CKA is at the low logic level, the AND gate 22 transitions the trigger signal to the low logic level.

The synchronizing module:

Referring to FIG. 3, the synchronizing module 3 includes a second storage unit F2, a third storage unit F3, a multiplexer 31, and an OR gate 32.

The second storage unit F2 includes a data terminal D electrically coupled to the first terminal (i) of the synchronizing module 3 for receiving the first pulse signal (s1), a clock terminal CK electrically coupled to the second terminal (i2) of the synchronizing module 3 for receiving the second clock signal CKB, a reset terminal (arst) electrically coupled to the reset terminal (r) of the synchronizing module 3 for receiving the external reset signal, and an output terminal Q. The second storage unit F2 is configured for sampling the first pulse signal (s1) according to the second clock signal CKB so as to output a second pulse signal (s2), which is phase-delayed with respect to the input signal IN, at the output terminal Q of the second storage unit F2. The second storage unit F2 is controlled by the external reset signal so as to decide whether to set the second pulse signal (s2) to a reset level. In this embodiment, the external reset signal is set to the low logic level, but the present invention is not limited to the disclosure of this embodiment.

The third storage unit F3 includes a data terminal D electrically coupled to the output terminal Q of the second storage unit F2 for receiving the second pulse signal (s2), a clock terminal CK electrically coupled to the second terminal (i2) of the synchronizing module 3 for receiving the second clock signal CKB, a reset terminal (arst) electrically coupled to the reset terminal (r) of the synchronizing module 3 for receiving the external reset signal, and an output terminal Q. The third storage unit F3 is configured for sampling the second pulse signal (s2) according to the second clock signal CKB so as to output a third pulse signal (s3) which is phase-delayed with respect to the second pulse signal (s2). The third storage unit F3 is controlled by the external reset signal so as to decide whether to set the third pulse signal (s3) to a reset level.

The multiplexer 31 has a first terminal electrically coupled to the first terminal (i1) of the synchronizing module 3 for receiving the first pulse signal (s1), a second terminal electrically coupled to the output terminal Q of the third storage unit F3 for receiving the third pulse signal (s3), a control terminal electrically coupled to the control terminal (c) of the synchronizing module 3 for receiving the control signal, and an output terminal electrically coupled to the output terminal (o) of the synchronizing module 3. The control terminal of the multiplexer 31 receives the control signal such that the multiplexer 31 is configured for selecting one of the first pulse signal (s1) and the third pulse signal (s3) to be outputted from the output terminal of the multiplexer 31 as the output signal OUT. When the first clock signal CKA is asynchronous with respect to the second clock signal CKB, the multiplexer 31 selects the third pulse signal (s3) as the output signal OUT. When the signal synchronizing device of the present invention is only operated in the asynchronous mode and is not required to switch between the synchronous mode and the asynchronous mode, the multiplexer 31 may be omitted and the third pulse signal (s3) is directly taken as the output signal OUT.

The OR gate 32 has a first terminal electrically coupled to the output terminal (o) of the synchronizing module 3 for receiving the output signal OUT, a second terminal electrically coupled to the reset terminal (r) of the synchronizing module 3 for receiving the external reset signal, and an output terminal electrically coupled to the feedback terminal (f) of the synchronizing module 3. The OR gate 32 is configured for performing a logic OR operation between the output signal OUT and the external reset signal so as to generate the feedback reset signal, and for outputting the feedback reset signal at the output terminal of the OR gate 32.

In this embodiment, each of the first, second and third storage units F1~F3 is preferably a D flip-flop.

Figure 5:
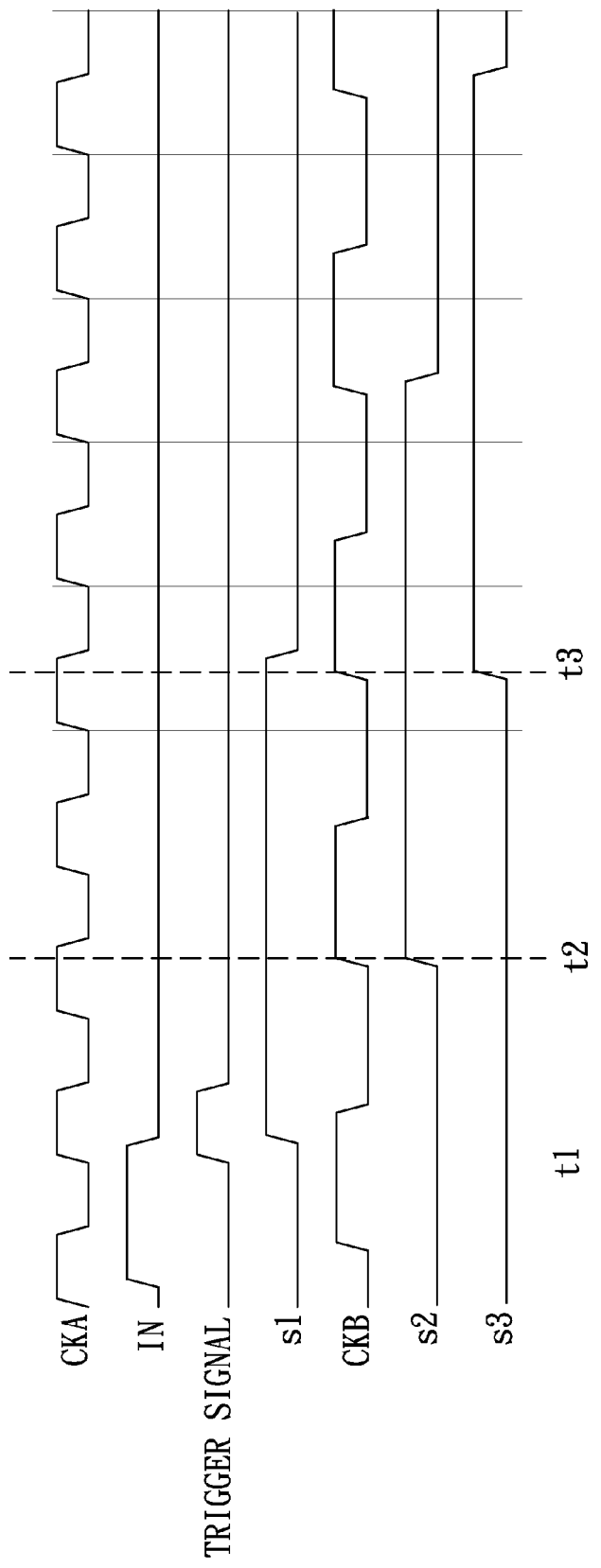
FIG. 5 is a timing diagram of a first condition of the preferred embodiment of the present invention.

Timing diagram:

Referring to FIG. 5, a first condition that the frequency of the first clock signal CKA is faster than that of the second clock signal CKB is illustrated. At a time point (t1), the trigger module 2 pulls up the trigger signal to the high logic level according to the first clock signal CKA and the input signal IN, arising edge of the trigger signal actuates the first storage unit F1 to sample the first logic level signal (1'$b$1) (i.e., a high logic level signal) received at the data terminal D, and then the first pulse signal (s1) is pulled up to the high logic level. At a time point (t2), arising edge of the second clock signal CKB actuates the second storage unit F2 to sample the first pulse signal (s1), so as to pull up the second pulse signal (s2) to the high logic level. At a time point (t3), the rising edge of the second clock signal CKB actuates the third storage unit F3 to sample the second pulse signal (s2), so as to pull up the third pulse signal (s3) to the high logic level, and then the third pulse signal (s3) is outputted via the multiplexer 31 as the output signal OUT. The output signal OUT pulls up the feedback reset signal to the high logic level via the OR logic gate 32 for resetting the first storage unit F1 so as to pull down the first pulse signal (s1) to the low logic level. The input signal IN corresponds with the frequency of the first clock signal CKA, and the output signal OUT (or the third pulse signal (s3)) corresponds with the frequency of the second clock signal CKB. In other words, a frequency relationship between the first clock signal CKA and the second clock signal CKB corresponds to a frequency relationship between the input signal IN and the output signal OUT (or the third pulse signal (s3)). That is to say, the signal synchronizing device of the present invention is capable of transferring data (the input signal IN) corresponding with the frequency of the first clock signal CKA into data (the output signal OUT or the third pulse signal (s3)) corresponding with the frequency of the second clock signal CKB.

Referring to FIG. 6, a second condition that the frequency of the first clock signal CKA is slower than that of the second clock signal CKB is illustrated. Since operation in the timing diagram of the second condition is similar to that of the first condition that the frequency of the first clock signal CKA is faster than the frequency of the second clock signal CKB, a detailed description thereof is not provided for the sake of brevity.

In summary, the aforementioned preferred embodiment, when compared with the prior art, has the following advantages:

1. By using the trigger module 2 to generate the trigger signal for actuating the first storage unit F1, and by using the feedback reset signal related to the output signal OUT to reset the first storage unit F1, the preferred embodiment may operate between the first and second conditions in which the frequency of the first clock signal CKA is faster and slower than that of the second clock signal CKB, respectively. Therefore, it is not required to know in advance which one of the frequencies of the first and second clock signals CKA, CKB is faster, such that the preferred embodiment may be utilized with relative ease.

2. It is not required to calculate a ratio between the frequencies of the first and second clock signals CKA, CKB using an additional counter, thus saving hardware costs.

3. The preferred embodiment may be switched between the first (asynchronous) mode and the second (synchronous) mode, and may be used regardless of which one of the frequencies of the first and second clock signals CKA, CKB is faster, thereby permitting a wider range of applicability.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A signal synchronizing device comprising:
a trigger module, for capturing an input signal according to a first clock signal so as to generate a trigger signal in a form of a pulse wave, the first clock signal corresponding with the input signal;
a first storage unit, for forming a first pulse signal by pulling an output of the first storage unit to a first logic level according to the trigger signal, and by pulling the output of the first storage unit from the first logic level to a second logic level according to a feedback reset signal; and
a synchronizing module, for performing synchronous transfer according to the first pulse signal so as to output an output signal corresponding with frequency of a second clock signal, and for generating the feedback reset signal according to the output signal, and an OR gate, for performing a logic OR operation between the output signal and an external reset signal so as to generate the feedback reset signal.

2. The signal synchronizing device as claimed in claim 1, wherein the trigger module comprises:
   a latch, for providing a latch signal which follows a logic level of the input signal in response to a signal edge of the first clock signal, the signal edge being selected from a rising edge and a falling edge; and
   an AND gate, for performing a logic AND operation between the latch signal and the first clock signal so as to generate the trigger signal.

3. The signal synchronizing device as claimed in claim 1, wherein the synchronizing module comprises:
   a second storage unit, for sampling the first pulse signal according to the second clock signal so as to generate a second pulse signal which is phase-delayed with respect to the input signal; and
   a third storage unit, for sampling the second pulse signal according to the second clock signal so as to generate a third pulse signal which is phase-delayed with respect to the second pulse signal; and
   wherein the synchronizing module is configured for generating the output signal according to one of the first pulse signal and the third pulse signal.

4. The signal synchronizing device as claimed in claim 3, wherein the synchronizing module further comprises:
   a multiplexer, for receiving the first pulse signal, the third pulse signal and a control signal, and for selecting one of the first pulse signal and the third pulse signal as the output signal according to the control signal; and
   wherein when the first clock signal is asynchronous with respect to the second clock signal, the multiplexer selects the third pulse signal as the output signal.

5. The signal synchronizing device as claimed in claim 3, wherein the second and third storage units are respectively controlled by an external reset signal so as to decide whether to set the second and third pulse signals to a reset level, respectively.

6. The signal synchronizing device as claimed in claim 3, wherein each of the first, second and third storage units is a D flip-flop.

7. A signal synchronizing device comprising:
   a trigger module, for capturing an input signal according to a first clock signal so as to generate a trigger signal, the first clock signal corresponding with the input signal;
   a first storage unit, for generating a first pulse signal according to the trigger signal and a feedback reset signal; and
   a synchronizing module, for outputting an output signal corresponding with frequency of a second clock signal according to the first pulse signal, and for generating the feedback reset signal according to the output signal, and
   an OR gate, for performing a logic OR operation between the output signal and an external reset signal so as to generate the feedback reset signal; and
   wherein the first clock signal is asynchronous with the second clock signal, and the output signal corresponds to the input signal.

8. The signal synchronizing device as claimed in claim 7, wherein the trigger module comprises:
   a latch, for providing a latch signal which follows a logic level of the input signal in response to a signal edge of the first clock signal; and
   an AND gate, for performing a logic AND operation between the latch signal and the first clock signal so as to generate the trigger signal.

9. The signal synchronizing device as claimed in claim 7, wherein the synchronizing module comprises:
   a second storage unit, for sampling the first pulse signal according to the second clock signal so as to generate a second pulse signal which is phase-delayed with respect to the input signal; and
   a third storage unit, for sampling the second pulse signal according to the second clock signal so as to generate a third pulse signal which is phase-delayed with respect to the second pulse signal; and
   wherein the synchronizing module is configured for generating the output signal according to the third pulse signal.

10. The signal synchronizing device as claimed in claim 9, wherein the second and third storage units are respectively controlled by an external reset signal so as to decide whether to set the second and third pulse signals to a reset level, respectively.

11. The signal synchronizing device as claimed in claim 9, wherein each of the first, second and third storage units is a D flip-Flop.

12. The signal synchronizing device as claimed in claim 7, wherein the first storage unit generates the first pulse signal by pulling an output of the first storage unit to a first logic level according to the trigger signal, and by pulling the output of the first storage unit from the first logic level to a second logic level according to the feedback reset signal.

* * * * *